(12) United States Patent
Murai et al.

(10) Patent No.: US 8,790,755 B2
(45) Date of Patent: Jul. 29, 2014

(54) ADHERING METHOD USING ELECTROSTATIC POWDER ADHESIVE, AND POWDER ADHESIVE TO BE USED IN ADHERING METHOD

(75) Inventors: Takefumi Murai, Takatsuki (JP); Yoshimi Shibata, Takatsuki (JP)

(73) Assignee: Sunstar Engineering Inc., Takatsuki-shi (JP)

( * ) Notice: Subject to any disclaimer, the term of this patent is extended or adjusted under 35 U.S.C. 154(b) by 2 days.

(21) Appl. No.: 13/510,106

(22) PCT Filed: Nov. 26, 2010

(86) PCT No.: PCT/JP2010/071116
§ 371 (c)(1),
(2), (4) Date: May 16, 2012

(87) PCT Pub. No.: WO2011/065476
PCT Pub. Date: Jun. 3, 2011

(65) Prior Publication Data
US 2012/0231176 A1  Sep. 13, 2012

(30) Foreign Application Priority Data
Nov. 27, 2009 (JP) .................................. 2009-269872

(51) Int. Cl.
*B05D 1/06* (2006.01)
(52) U.S. Cl.
USPC .......................................... 427/475; 427/477
(58) Field of Classification Search
None
See application file for complete search history.

(56) References Cited

U.S. PATENT DOCUMENTS

| | | | |
|---|---|---|---|
| 3,556,829 A * | 1/1971 | Gebura | 106/487 |
| 6,841,025 B2 * | 1/2005 | Kolhammer et al. | 156/283 |
| 2002/0031614 A1 * | 3/2002 | Waterkamp et al. | 427/475 |
| 2003/0194547 A1 * | 10/2003 | Fuhrmann et al. | 428/304.4 |
| 2010/0263792 A1 * | 10/2010 | Spyrou et al. | 156/331.4 |

FOREIGN PATENT DOCUMENTS

| | | |
|---|---|---|
| JP | 7-197002 | 8/1995 |
| JP | 8-81671 | 3/1996 |
| JP | 9-59579 | 3/1997 |
| JP | 11-35850 | 2/1999 |
| JP | 11-179247 | 7/1999 |
| JP | 2000-117090 | 4/2000 |
| JP | 2002-60718 A1 | 2/2002 |
| JP | 2004-35799 A1 | 2/2004 |
| JP | 2004-284575 A1 | 10/2004 |
| JP | 2005-126562 A1 | 5/2005 |
| JP | 2005-187515 A1 | 7/2005 |
| JP | 2008-248042 A1 | 10/2008 |
| WO | WO 81/00718 A1 | 3/1981 |
| WO | WO95/26374 A1 | 10/1995 |

OTHER PUBLICATIONS

International Search Report for International Application No. PCT/JP2010/071116 dated Jan. 18, 2011.

* cited by examiner

*Primary Examiner* — Frederick Parker
(74) *Attorney, Agent, or Firm* — Kratz, Quintos & Hanson, LLP

(57) ABSTRACT

Provided is an adhering method which comprises spray-coating an adherend with a powder adhesive and then using the adherend, thereby enabling the formation of an automobile interior part having good heat tolerance and high adhesion strength. The adhering method to be used for forming an automobile interior part involves a step for spray-coating an adherend (4) with a powder adhesive (6) with the use of an electrostatic powder spray gun (5). If necessary, the adhering method may further involve a step for inciting the powder adhesive, which has been spray-coated on the adherend, by heating with an infrared heater.

6 Claims, 1 Drawing Sheet

ADHERING METHOD USING ELECTROSTATIC POWDER ADHESIVE, AND POWDER ADHESIVE TO BE USED IN ADHERING METHOD

TECHNICAL FIELD

The present invention relates to an adhering method of a member and more specifically relates to an adhering method used for forming an automobile interior part. The present invention also relates to a powder adhesive to be used in the adhering method.

BACKGROUND ART

Conventionally, the adhering method used for forming an automobile interior part has widely employed a method of spray-coating an adherend with a two pack type solvent adhesive. However, such a method is not desirable in working environment because an organic solvent and the like used as the solvent is diffused during spray-coating or drying of the adhesive. Such a method may affect external environment when, for example, the solvent leaks to the outside of a workplace. To address this, the method causes a problem of requiring equipment and the like for recovering the solvent. The method has other problems. The solvent adhesive is a liquid. Hence, the adhesive that is applied on any other area than an adherend is difficult to be recovered and the method increases spray loss. Furthermore, the two pack type adhesive that remains in a tank is required to be discarded and the inside of the tank is required to be washed with an organic solvent, for example, at the end of daily operation. Hence, the method causes material loss. Moreover, these substances are required to be disposed of as industrial waste products.

As a method for improving these problems, various adhesives and the like have been developed (Patent Documents 1 to 4).

Patent Document 1 discloses a one pack type chloroprene adhesive composition rather than the two pack type, but the environmental issues are not improved because the composition is a solvent adhesive. Patent Document 2 discloses an aqueous adhesive rather than the solvent adhesive. However, the adhesive is a two pack type adhesive to leave the problems of material loss and the like, and also the adhesive is an aqueous adhesive to cause a problem of taking long time for drying. Patent Document 3 discloses a hot melt adhesive rather than the solvent adhesive. The adhesive has a short open time after coating of the adhesive to cause a problem of material loss during coating. Patent Document 4 discloses a precoated surface material for an automobile interior in which a hot melt adhesive is previously applied to the back surface of an automobile interior surface material. The adhesive is a precoated type and is previously applied to the surface material. Hence, the adhesive has a problem of material loss when, for example, an unnecessary part is cut off.

Meanwhile, in the field of coating technology, a powder coating is used. A carbodiimide compound and the like are disclosed as a curing agent for the powder coating (Patent Document 5), and an electrostatic powder coating method that enables the adhesion of an acrylic powder coating to the surface of an aluminum wheel is disclosed (Patent Document 6). However, for the application to adhesion technology, especially for the application to automobile interior parts, there are some problems in heat tolerance (including heat tolerance in a high temperature environment. Hereinafter the same applies), adhesion strength, and the like that should be solved. Such an application is not easy under present circumstances.

In the field of thermosetting compositions that are used for adhesives and the like, from the viewpoint of satisfying both cold curability and storage stability, there is disclosed a thermosetting composition including a mixture of a particular urethane prepolymer and a fine powder coated amine in which active amino groups on a surface are covered (Patent Documents 7 and 8). However, in the thermosetting composition described in Patent Documents 7 and 8, as the fine powder for covering the active amino group, in Examples, the fine powder used for the coated amine is exemplified by titanium oxide, hydrophobic silica, and polyvinyl chloride alone. Furthermore, the present inventors have studied to reveal problems in the storage stability. For example, the thermosetting composition may form aggregates due to heat (temperature effect at room temperature) or humidity during a long-term storage even when titanium oxide is used, and the formed aggregate is difficult to be re-powdered. Thus, such a composition may interfere with spray-coating of an adherend or may inhibit the curing reaction (hereinafter, also referred to as blocking).

CITATION LIST

Patent Literatures

Patent Document 1: JP-A No. H9-59579
Patent Document 2: JP-A No. H8-81671
Patent Document 3: JP-A No. 2004-35799
Patent Document 4: JP-A No. 2004-284575
Patent Document 5: JP-A No. H11-35850
Patent Document 6: JP-A No. H11-179247
Patent Document 7: International Publication WO 95/26374
Patent Document 8: JP-A No. 2000-117090

SUMMARY OF INVENTION

Technical Problem

In view of the above problems, it is an object of the present invention to provide an adhering method that includes spray-coating an adherend with a powder adhesive and using the adherend to enable the formation of an automobile interior part having good heat tolerance and high adhesion strength and a powder adhesive to be used in the adhering method.

The present invention has another object to provide an adhering method that enables the spray-coating of an adherend and enables the formation of an automobile interior part having good heat tolerance and high adhesion strength even after a powder adhesive is stored for a long time and a powder adhesive to be used in the adhering method.

Solution to Problem

The present inventors have carried out intensive studies in order to solve the problems and have found that spray-coating an adherend with a powder adhesive using an electrostatic powder spray gun enables the formation of an automobile interior part using the adherend, and the invention has been accomplished.

That is, the present invention relates to (1) an adhering method used for forming an automobile interior part, the adhering method including a step of spray-coating an adherend with a powder adhesive using an electrostatic powder spray gun.

The present invention relates to (2) the adhering method used for forming an automobile interior part according to item (1), in which the powder adhesive includes a mixture of two or more powders containing compounds having reactivity with each other.

The present invention relates to (3) the adhering method used for forming an automobile interior part according to item (2), in which one of the powders is a powder including a polyester resin compound having a carboxy group and a number average molecular weight of 1,000 to 35,000.

(4) In the adhering method used for forming an automobile interior part according to item (2) or (3), one of the powders is a powder including a compound having a functional group containing a nitrogen atom.

The present invention relates to (5) the adhering method used for forming an automobile interior part according to item (4), in which the functional group containing a nitrogen atom is a carbodiimide group.

The present invention relates to (6) the adhering method used for forming an automobile interior part according to item (4), in which the powder including a compound having a functional group containing a nitrogen atom has a surface fixed with a fine powder composed of calcium carbonate and/or clay.

The present invention relates to (7) the adhering method used for forming an automobile interior part according to any one of items (1) to (6), the adhering method further including a step of melting the powder adhesive on the adherend by heating with an infrared heater, the adherend being spray-coated with the powder adhesive.

The present invention relates to (8) a powder adhesive used for forming an automobile interior part, the powder adhesive including a mixture of two or more powders including compounds having reactivity with each other.

The present invention relates to (9) the powder adhesive used for forming an automobile interior part according to item (8), in which one of the powders is a powder including a polyester resin compound having a carboxy group and a number average molecular weight of 1,000 to 35,000.

(10) In the powder adhesive used for forming an automobile interior part according to item (8) or (9), one of the powders is a powder including a compound having a functional group containing a nitrogen atom.

The present invention relates to (11) the powder adhesive used for forming an automobile interior part according to item (10), in which the functional group containing a nitrogen atom is a carbodiimide group.

The present invention relates to (12) the powder adhesive used for forming an automobile interior part according to item (10), in which the powder including a compound having a functional group containing a nitrogen atom has a surface fixed with a fine powder composed of calcium carbonate and/or clay.

Advantageous Effects of Invention

The adhering method of the present invention uses the powder adhesive. Thus, the method can eliminate the environmental and equipment problems due to solvent diffusion and can reduce the spray loss and the amount of materials. The use of the predetermined powder adhesive of the present invention can lead to the production of an automobile interior part having better heat tolerance and higher adhesion strength.

Furthermore, the use of the particular powder fixed with the particular fine powder can suppress the aggregation or the blocking of the powder adhesive more effectively and hence can achieve the formation of an automobile interior part in the adhering method while maintaining good heat tolerance and high adhesion strength.

DESCRIPTION OF EMBODIMENTS

Figure 1:
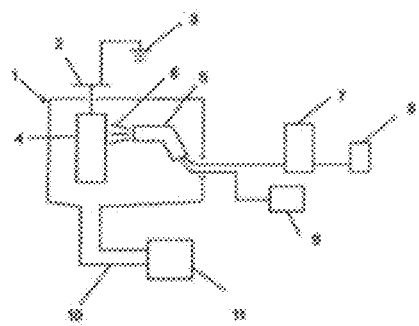
FIG. 1 is a schematic view showing an example of a step included in the adhering method of the present invention.

The adhering method used for forming an automobile interior part of the present invention includes a step of spray-coating an adherend with a powder adhesive using an electrostatic powder spray gun. In this manner, in the present invention, a powder adhesive is used as the adhesive. This can reduce the loads on working environment and external environment that have been caused by the use of conventional solvent adhesives. Furthermore, as described later, the adhesive can be readily recovered and can be reused. Hence, the method can greatly reduce the spray loss.

The principle of the spray-coating using the electrostatic powder spray gun is that a powder adhesive is transferred on a gas flow such as an air flow to the spray gun or a spray head of the gun, the same charge is applied to each particle in the powder adhesive, each particle adheres to a grounded adherend by electrostatic force, and a coating layer of the powder adhesive is temporarily formed on the adherend. In this manner, the use of the electrostatic powder spray gun generates electrostatic force between the powder and the adherend, and the action of electrostatic force can achieve the efficient adhesion of the powder adhesive to the adherend. Moreover, the static charges are equally generated on a surface of the adherend, and hence the method has a beneficial effect especially on an adherend having a complicated structure.

The electrostatic powder spray gun used in the present invention is not specifically limited as long as it can charge a powder adhesive to be used. A corona charging spray gun using corona charging, a tribocharging spray gun using tribocharging, a spray gun combining these systems, and the like can be suitably selected for use. These spray guns may be commercially available spray guns. When the spray gun using corona charging (including combination use) is used, a high voltage direct current is applied between a grounded adherend and a leading end of the electrostatic powder spray gun and a generated electric field may lead to more efficient adhesion of the powder adhesive to the adherend.

In the present invention, any powder adhesive can be used without limitation as long as it can be stably applied by the electrostatic powder spray gun, has characteristics such as heat tolerance and adhesion strength that are required for automobile interior parts, and is melted at a temperature at which an adherend is not thermally deformed in the step of melting by heating described later.

From the viewpoint of stable spray-coating by the electrostatic powder spray gun, the powder preferably has a particle size of 5 to 400 µm. The powder more preferably has a particle size of 10 to 200 µm and even more preferably 20 to 50 µm. A powder having a particle size of less than 5 µm or more than 400 µm has a lower adhesiveness. The particle size can be determined with a commercially available analyzer, for example, Particle Size Distribution Analyzer LA700 (manufactured by Horiba, Ltd.).

From the latter viewpoints that the powder adhesive has characteristics such as heat tolerance and adhesion strength for automobile interior parts and is melted at a temperature at which an adherend is not thermally deformed, the powder adhesive preferably has a melting point of 80° C. to 140° C. A powder adhesive having a melting point of lower than 80° C. leads to decreased heat tolerance of a joint, while a powder adhesive having a melting point of higher than 140° C. requires a higher melting temperature to be set and such a temperature is not preferred from the viewpoints of the heat tolerance of an adherend and energy needed.

The powder adhesive used in the present invention may be a mixture of two or more powders including compounds having reactivity with each other. Such a composition suppresses a molecular weight and a melting temperature to some extent to suppress thermal deformation of an adherend to a maximum extent in an initial stage, and each powder is melted and reacted to increase the molecular weight and then can lead to a junction that has heat tolerance and adhesion strength and is usable as an automobile interior part.

Examples of the powder composition having the characteristics include a combination of a powder including a resin compound such as an acrylic resin compound, an epoxy resin compound, and a polyester resin compound or including an appropriate combination of them and a powder including a compound having reactivity with them. Such a mixture of two or more powders can be used.

Among them, one of the powders is preferably a powder including a polyester resin compound having a carboxy group and a number average molecular weight of 1,000 to 35,000, preferably 2,000 to 30,000, and more preferably 2,000 to 25,000 because such a powder adhesive achieves the characteristics such as heat tolerance and adhesion strength and is melted for adhesion at a temperature at which an adherend is not thermally deformed. As the resin compound constituting one of the powders, the polyester resin compound is preferred because it has excellent adhesiveness and an adequate melting temperature. A polyester resin compound having a number average molecular weight of less than 1,000 is likely to achieve insufficient heat tolerance, while a polyester resin compound having a number average molecular weight of more than 35,000 is likely to reduce surface wettability of the adhesive to lower the adhesive strength. The number average molecular weight can be determined with a commercially available analyzer, for example, a high-performance liquid chromatograph (gel permeation chromatograph (GPC)) RID-10A, SPD-10A, and CTO-10A (manufactured by Shimadzu Corporation).

As the polyester resin compound having a carboxy group, various polyester resin compounds can be used as long as the resin compound has a carboxy group, within the above characteristics. The carboxy group is preferably contained in an amount of 1 to 100 mg KOH/g and more preferably 20 to 80 mg KOH/g in terms of acid value. A polyester resin compound containing a carboxy group having an acid value of less than 1 mg KOH/g reduces cross-linking density to lead to insufficient heat tolerance, while a polyester resin compound containing a carboxy group having an acid value of more than 100 mg KOH/g increases polarity and is likely to reduce the adhesiveness to a low polar adherend such as polypropylene. The acid value can be determined in accordance with JIS K0070.

Such a polyester resin compound having a carboxy group can be produced by known methods, and also a commercially available polyester resin compound may be used.

Examples of the polyester resin compound used in the present invention include a polyester obtained by condensation reaction of a polybasic acid such as malonic acid, succinic acid, adipic acid, pimelic acid, suberic acid, azelaic acid, sebacic acid, terephthalic acid, and isophthalic acid with a polyhydric alcohol such as ethylene glycol, propylene glycol, 1,3-propanediol, 1,4-butanediol, 1,5-pentanediol, 1,6-hexanediol, neopentyl glycol, diethylene glycol, triethylene glycol, polyethylene glycol, polypropylene glycol, polybutylene glycol, polycaprolactone diol, 2,2-dimethylpropanediol, 2,2-bis(4-hydroxycyclohexyl)propane, 1,4-dihydroxymethylcyclohexane, trimethylolpropane, 1,2,3-trihydroxypropane, and tetramethylolmethane.

One of the powders to be used may be a powder including a compound containing a functional group having a reactivity with a carboxy group, and examples of such a compound include a compound containing, for example, a hydroxy group, an aldehyde group, a carboxy group, a sulfo group, an amino group, a glycidyl group, an isocyanate group, a carbodiimide group, an oxazoline group, an oxazine group, an ester group, an amido group, a silanol group, and a silyl ether group. Among them, from the viewpoint of the reactivity with the carboxy group, a compound having a functional group containing a nitrogen atom is preferred and a compound having a carbodiimide group is more preferred. The compound is mixed with, for example, a powder including the predetermined polyester resin compound having a carboxy group as the other one of the powders to be used, and the various functional groups are reacted with the carboxy group. This can increase the molecular weight while maintaining the characteristics of the basic skeleton of the resin compound and can improve the heat tolerance.

The compound having a carbodiimide group is reacted with an active hydrogen group (in a carboxy group, an amino group, or a hydroxy group) in a compound contained in the other powder to further increase the heat tolerance and the adhesive strength. Thus, such a compound can be used in combination with a resin compound having an active hydrogen group such as an amino group and a hydroxy group in addition to the resin compound having a carboxy group.

Any compound having a carbodiimide group may be used without particular limitation as long as the functional group is included in the molecule, and a known compound may be used. However, a polycarbodiimide having two or more carbodiimide groups in the molecule is preferred from the viewpoint of reactivity. Specific examples of the polycarbodiimide include Carbodilite (registered trademark) manufactured by Nisshinbo Industries, Inc.

In the present invention, a powder adhesive including the powder that includes a compound having a functional group containing a nitrogen atom and that has a surface fixed with a fine powder composed of calcium carbonate and/or clay may be used. These fine powders are especially preferred because such a fine powder has high thermal stability and moisture stability.

The use of the powder adhesive fixed with such a fine powder can lead to effective suppression of the generation of an aggregate due to heat or moisture when the powder adhesive is stored for a long time as a mixture of two or more powders including compounds having reactivity with each other. Furthermore, even when the aggregate is generated to some extent, the aggregate is easily destroyed. Hence, such a powder adhesive is unlikely to cause trouble in a spray-coating step, for example, the aggregate causes clogging in a spray nozzle and hence the spray-coating is unlikely to be performed.

Furthermore, the particular fine powder is fixed so as to cover the functional group (for example, a carbodiimide group) containing a nitrogen atom and the functional group is protected by the fine powder. This effectively suppresses a reaction with a compound having reactivity with the functional group during a long-term storage. Meanwhile, the functional group (for example, a carbodiimide group) containing a nitrogen atom is not modified and the reactivity is not reduced or the reactivity reduction is more effectively suppressed. Thus, the powder adhesives can be polymerized at the time of curing reaction and can achieve desired adhesive strength and heat tolerance.

Here, the long-term storage means storage at ambient temperature for at least four months (including a condition equivalent to this, such as so-called accelerated test).

The calcium carbonate used in the present invention may have any particle structure and surface characteristics without particular limitation as long as it has thermal stability and moisture stability. Examples of the particle structure include a spherical structure, a cubic structure, a spindle structure, and mixtures of them. The surface characteristics may be hydrophilic or hydrophobic. For a hydrophobic surface, the surface is modified and treated with a fatty acid or the like for use. A commercially available calcium carbonate may be used.

The clay used in the present invention may have any particle structure and surface characteristics without particular limitation as long as it has thermal stability and moisture stability. The particle structure may have an indefinite shape. The surface characteristics may be hydrophilic or hydrophobic. For a hydrophobic surface, the surface is treated with silane. Examples of the silane treatment include, but are not limited to, treatments using vinylsilane, mercaptosilane, and the like. A commercially available clay may be used.

The powder (hereinafter also referred to as nitrogen-containing functional group-containing powder) that includes a compound having a functional group containing a nitrogen atom and that has a surface fixed with a fine powder composed of calcium carbonate or clay is produced by a shear-friction mixing system in which the fine powder is added to the nitrogen-containing functional group-containing powder while pulverizing the nitrogen-containing functional group-containing powder within a predetermined mean particle size range, the mixture is mixed and pulverized so that the fine powder will have a predetermined mean particle size range, and consequently the fine powder is fixed to the surface of the nitrogen-containing functional group-containing powder. By using a high speed impact mill or a compression shear mill for a previously finely pulverized nitrogen-containing functional group-containing powder with the fine powder, a fine powder coated nitrogen-containing functional group-containing powder can also be produced, and this system, especially, the high speed impact mill is more preferably used.

The amount of the calcium carbonate or the clay used is preferably designed so that the weight ratio of the powder (hereinafter also abbreviated as nitrogen-containing functional group-containing powder) including a compound having the functional group (for example, a carbodiimide group) containing a nitrogen atom and the fine powder composed of calcium carbonate and/or clay will be 100/1 to 100 and more preferably 100/50 to 90. A fine powder having a ratio of less than 1 does not provide the effect on the storage stability, while a fine powder having a ratio of more than 100 does not further improve the storage stability.

In this manner, it is supposed that by mixing and pulverizing the nitrogen-containing functional group-containing powder with the fine powder, for example, static electricity is generated to fix the fine powder onto the surface of the nitrogen-containing functional group-containing powder; the mechanical power of a mill generates friction, impact, compression shear, or the like to generate heat and the heat leads to a melting and fixing phenomenon that locally occurs on the nitrogen-containing functional group-containing powder to fix the fine powder; the fine powder is physically anchored or buried to the surface of the nitrogen-containing functional group-containing powder; or the fine powder is chemically activated to be fixed (that is, the active nitrogen atom-containing group on the surface of the nitrogen-containing functional group-containing powder is covered with the fine powder). The mean particle size of the fixed fine powder is preferably 1/10 or less of that of the nitrogen-containing functional group-containing powder. A fine powder having a mean particle size of more than the value is likely not to be fixed to the surface of the nitrogen-containing functional group-containing powder.

The mixture ratio of two or more powders including compounds having reactivity with each other is not specifically limited as long as the advantageous effect of the invention is obtained. For example, when the powder including a predetermined polyester resin is mixed with the powder including a compound containing a functional group having reactivity with a carboxy group, the mixture preferably contains the functional group that reacts with a carboxy group in an amount of 0.5 to 2.0 mol based on 1 mol of the carboxy group. A mixture containing the functional group in an amount of less than 0.5 mol or more than 2.0 mol is likely to decrease the heat tolerance of the adhesive.

The powder adhesive as above is pulverized using a known pulverizer after the preparation of a predetermined resin or the like or, for example, a compound containing a functional group having reactivity with a carboxy group by a known method. The pulverized powder adhesive is homogeneously mixed and dispersed with a known powder mixer such as a container rotary mixer and a container fixed mixer for preparation. At the time, the mixing and dispersing is preferably performed at 50° C. or less. A preparation at a temperature of more than 50° C. may lead to the aggregation of powder particles constituting the powder adhesive to be obtained in a powder mixer or a pulverizer.

Examples of a base material used as the adherend used in the present invention include a plate-like molded article made from a synthetic resin, such as an ABS plate, a noryl plate, an ASG plate, a polycarbonate plate, and a polypropylene (PP) board; a plate-like molded article using a woody material such as kenaf and a wood chip; a steel plate; and a composite body of them (for example, a composite board of kenaf and a polypropylene resin). As necessary, each base material may have a treated surface for easy adhesion of the powder adhesive.

An example of the adhering method used for forming an automobile interior part of the present invention will be simply described using Figs.

As shown in FIG. 1, in a coating booth 1, an adherend 4 that is connected to a grounding 3 through a conveyor 2 is placed, and the adherend 4 is spray-coated with a powder adhesive 6 using an electrostatic powder spray gun 5. In this example, in order to feed air for transferring the powder adhesive under pressure to the electrostatic powder spray gun 5, a compressor 8 is connected to a powder adhesive feeding tank 7 and the tank 7 is connected to the spray gun 5 through a pipe. The spray gun 5 has a leading end to which a high voltage generator 9 is provided for generating high voltage. That is, in the example, the spray gun 5 employs a corona discharge system.

In the present invention, as shown in FIG. 1, a powder adhesive used for spray-coating that does not adhere to the adherend 4 is recovered by a recovery unit 11 that is connected to the coating booth 1 through a duct 10 and the recovered powder adhesive may be reused. In this manner, in the adhering method of the present invention, the powder adhesive that does not adhere to an adherend can be recovered and reused, and hence the method can greatly reduce the spray loss.

In the present invention, after the adherend is spray-coated with the powder adhesive to form a coating layer (adhesive layer) of the powder adhesive as mentioned above, the adhesive is preferably melted by heating. Usable examples of the heating means include a method using heated air and a method using infrared light. The methods may employ a common hot-air drier, a common infrared heater, and the like, correspondingly.

However, from the viewpoint of efficiently melting the powder adhesive with which the adherend is spray-coated, by heating, infrared light is preferably used for melting by heating. In this manner, by adopting the method using infrared light, the infrared light passes through the whole adhesive layer that adheres to and covers the adherend surface and that is present from the outermost surface of the adhesive to the adherend surface, and consequently such a method can simultaneously melt the whole adhesive by heating. The heating by the infrared light is due to radiative heat transfer, thus achieves a higher temperature increase rate than that of convective heat transfer by, for example, hot-air drying, and hence can give a higher heat flux to the powder adhesive. When the infrared heater is used, infrared light is applied to a surface coated with the adhesive alone due to the structure. Hence, the adherend is not directly irradiated and heated with infrared light.

Accordingly, when the adhesive is melted by heating with the infrared light, the whole adhesive layer adhering to and coating the adherend surface can be simultaneously melted by heating for a short period. Therefore, such a method can greatly reduce the heating of the adherend itself and can further effectively suppress heat deformation and the like of the adherend.

In contrast, in the case of hot-air drying, the heating is limited to the convective heat transfer. Thus, the outermost surface of the adhesive is readily dried, while the melting of the whole adhesive layer by heating requires a higher heated air temperature or a longer heating time because the heating to the inside of the adhesive layer is performed by conductive heat. However, such a condition elongates the heating time for the adherend itself. In addition, when a hot-air drier is used, the whole adherend is needed to be placed in an apparatus for heating due to the structure. Hence, when the whole adhesive layer is melted by heating, the adherend is likely to be excessively heated to cause heat deformation or the like.

Usable examples of the infrared heater used in the present invention include a near infrared (short wavelength infrared) heater having a radiator temperature of about 1,400 to 2,100° C., a medium wavelength infrared heater having a radiator temperature of about 800 to 1,200° C., and a far infrared (long wavelength infrared) heater having a radiator temperature of about 400 to 700° C. Specific examples of the near infrared heater include a quartz glass heater, specific examples of the medium wavelength infrared heater include a carbon heater and a quartz glass heater, and specific examples of the far infrared heater include a ceramic heater.

For the heating condition by an infrared heater, considering characteristics, for example, the melting point of the powder adhesive and the melting point or the glass transition temperature of an adherend, the irradiation temperature of infrared light, the distance between an infrared heater and an adherend surface coated with the powder adhesive, the irradiation time, and the like can be appropriately designed.

The adherend coated with the powder adhesive that is melted by heating as described above is used for the formation of an automobile interior part. A specific example of the forming method is as below but the method is not limited to the below. That is, the adherend with the powder adhesive melted by heating as above is stacked on a surface material while maintaining the surface temperature at 130° C. or more and preferably 150 to 180° C., and the whole is compressed with heat at a pressure of 0.05 MPa or more for 10 seconds or more for simultaneous molding and adhesion. Consequently, the surface material adheres to the adherend to provide a desired automobile interior part.

Examples of the automobile interior part include inside trims such as a door trim, a front pillar, a rear pillar, a deck side trim, and a center pillar; an instrument panel; a molded ceiling; a console box; and a luggage compartment.

EXAMPLES

Examples 1 and 2 and Reference Examples 1 to 4

Powders of a polyester resin and carbodiimide were mixed in a ratio shown in Table 1 to prepare a powder adhesive. In Table 1, the polyester resin 1 is UPICACOAT GV-250 manufactured by Japan U-PiCA Company, Ltd., the polyester resin 2 is ER-8700 manufactured by Unitika Ltd., the polyester resin 3 is VYLON (registered trademark) GA-6300 manufactured by Toyobo Co., Ltd., and the carbodiimide is CARBODILITE (registered trademark) HMV-80CA manufactured by Nisshinbo Industries, Inc.

Figure 2:
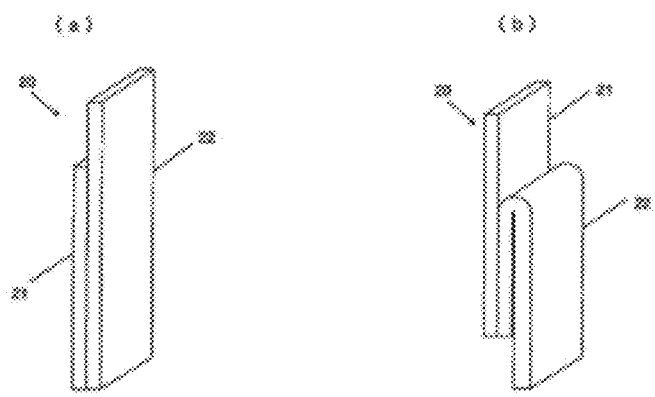
FIG. 2 is a schematic view showing a sample shape used for a peeling test.

With each powder adhesive prepared, a kenaf-polypropylene resin composite board (a thickness of 2 mm, a width of 100 mm, a length of 75 mm) (hereinafter referred to as composite board) as an adherend was spray-coated using an electrostatic powder spray gun (GX7000C cup gun system manufactured by Nihon Parkerizing Co., Ltd.). Next, the adhesive coated surface of the composite board was irradiated with infrared light using an infrared heater to heat the adhesive coated surface for 2 minutes for adjusting the surface temperature at 170° C. Then, the adhesive coated surface of the composite board was stacked onto a fabric with urethane foam as a surface material and the whole was compressed at 0.2 MPa for 10 seconds to give an automobile interior part (test sample). FIG. 2(a) is a schematic view of the prepared automobile interior part (test sample) 20, in which the composite board 21 adheres to the fabric 22 with urethane foam, by compression. For the evaluation test, the fabric 22 with urethane foam was made longer than the composite board 21.

Production Example 1

Based on 100 parts by weight of carbodiimide (manufactured by Nisshinbo Industries, Inc., 10M-SP, a mean particle size of about 10 µm), 80 parts by weight of calcium carbonate (manufactured by SHIRAISHI CALCIUM KAISHA, LTD., Hakuenka CCR, hydrophobically surface-treated with a fatty acid, a mean particle size of about 0.8 µm) was mixed and the whole was pulverized with Hybridizer type I manufactured by Nara Machinery Co., Ltd. to give 78 parts of calcium carbonate coated carbodiimide having a mean particle size of about 10 µm.

Production Example 2

Based on 100 parts by weight of carbodiimide (manufactured by Nisshinbo Industries, Inc., 10M-SP, a mean particle size of about 10 µm), 70 parts by weight of clay (manufactured by SHIRAISHI CALCIUM KAISHA, LTD., ST-309, hydrophobically surface-treated with mercaptosilane, a mean particle size of about 0.7 μm) was mixed and the whole was pulverized with Hybridizer type I manufactured by, to give 139 parts of clay coated carbodiimide having a mean particle size of about 10 μm.

Production Example 3

Based on 100 parts by weight of carbodiimide (manufactured by Nisshinbo Industries, Inc., 10M-SP, a mean particle size of about 10 μm), 10 parts by weight of titanium oxide (manufactured by ISHIHARA SANGYO KAISHA, LTD., TTO-55, surface-treated with Al(OH)$_3$/stearic acid, a mean particle size of about 0.03 to 0.05 μm) was mixed and the whole was pulverized with Hybridizer type I manufactured by Nara Machinery Co., Ltd. to give 94 parts of clay coated carbodiimide having a mean particle size of about 10 μm.

Examples 3 and 4 and Reference Examples 5 and 6

<Preparation of Powder Adhesive>

The polyester resin 1 (a molecular weight of 2,200, an acid value of 74, manufactured by Japan U-PiCA Company, Ltd., GV-250), the polyester resin 2 (a molecular weight of 6,800, an acid value of 24, manufactured by Unitika Ltd., ER-8700), and any of the fine powder coated carbodiimide prepared in Production Examples 1 to 3 or untreated carbodiimide powder were mixed in a ratio shown in Table 2 to prepare a powder adhesive. The powder adhesive immediately after the preparation was subjected to the production of an automobile interior part, the measurement of gel permeation chromatography (GPC), and the evaluation of long-term storage stability, described later.

<Long-Term Storage Stability Test>

Each powder adhesive immediately after the preparation as above was stored at 40° C. for 20 days. Each powder adhesive after the storage was subjected to the production of an automobile interior part and the GPC measurement described later.

<Production of Automobile Interior Part>

With each powder adhesive prepared (the powder adhesive immediately after the preparation (before storage), the powder adhesive after the long-term storage (after storage)), a kenaf-polypropylene resin composite board (a thickness of 2 mm, a width of 100 mm, a length of 75 mm) (hereinafter, referred to as composite board) as an adherend was spray-coated using an electrostatic powder spray gun (manufactured by SANNO CO., Ltd., type JP80T). The coating amount of the powder adhesive to the composite board was 20 g.

Next, the adhesive coated surface of the composite board was irradiated with infrared light using an infrared heater to heat the adhesive coated surface for 3 minutes for adjusting the surface temperature at 195° C. Then, the adhesive coated surface of the composite board was stacked onto a fabric with urethane foam as a surface material and the whole was compressed at 0.2 MPa for 10 seconds to give an automobile interior part (test sample). FIG. 2(a) is a schematic view of the prepared automobile interior part (test sample) 20, in which the composite board 21 adheres to the fabric 22 with urethane foam, by compression. For the evaluation test, the fabric 22 with urethane foam was made longer than the composite board 21.

<GPC Measurement>

Each powder adhesive immediately after the preparation (before storage) and after the long-term storage (after storage) was heated in a circulating hot air oven in a curing condition shown in Table 3. Each cured object was cooled and then dissolved and diluted in tetrahydrofuran. The solution was subjected to a GPC measurement apparatus (manufactured by Shimadzu Corporation, RID-10A) to determine the molecular weight of each cured object in terms of polystyrene. The test results are shown in Table 3.

(Evaluation)

The automobile interior part produced as above was subjected to peeling test in the condition below. The test results are shown in Tables 1 and 4. Each powder adhesive of Reference Examples 5 and 6 after storage caused aggregates and thus was difficult to prepare the test sample. Hence, the evaluations except for the blocking were not examined.

<Initial Creep>

Figure 3:
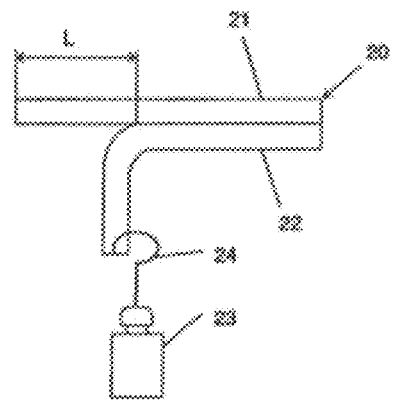
FIG. 3 is a schematic view showing a test method of heat tolerance creep test in the peeling test.

Immediately after the adhesion of the composite board 21 and the fabric 22 with urethane foam by compression, as schematically shown in FIG. 3, a weight (200 g) 23 was hanged through a wire 24 for 5 minutes in an atmosphere at 60° C. and the peeled length L was measured. Each peeling state of Examples 3 and 4 and Reference Examples 5 and 6 was also observed.

<Normal Peeling>

Each sample was rested (left) at 20° C. and 65% RH for 24 hours, and then peel strength [N/25 mm] was determined in a condition at room temperature. As shown in the schematic view in FIG. 2(b), the strength when the fabric 22 with urethane foam was peeled off from the composite board 21 was determined and the peeling state was observed.

<Heat Tolerance Creep>

Each sample was rested (left) at 20° C. and 65% RH for 24 hours, then, as schematically shown in FIG. 3, a weight (100 g) 23 was hanged through a wire 24 for 24 hours in an atmosphere at 80° C., and the peeled length L was measured. Each peeling state of Examples 3 and 4 and Reference Examples 5 and 6 was also observed.

<Blocking>

In each powder adhesive after the long-term storage, the presence or absence of aggregates was visually observed.

Criteria: A sample with no aggregate is represented as A, while a sample with aggregates is represented as B.

TABLE 1

|  |  | Example 1 | Example 2 | Reference Example 1 | Reference Example 2 | Reference Example 3 | Reference Example 4 |
|---|---|---|---|---|---|---|---|
| Formulation [parts by weight] | Polyester resin 1 (molecular weight 2200, acid value 74 mg KOH/g) | 20 | — | — | 20 | — | — |
|  | Polyester resin 2 (molecular weight 6800, acid value 24 mg KOH/g) | — | 20 | — | — | 20 | — |
|  | Polyester resin 3[1] (molecular weight 25000) | — | — | 20 | — | — | 20 |
|  | Carbodiimide | 5 | 5 | 5 | — | — | — |

TABLE 1-continued

|  |  | Example 1 | Example 2 | Reference Example 1 | Reference Example 2 | Reference Example 3 | Reference Example 4 |
|---|---|---|---|---|---|---|---|
| Evaluation | Initial creep [mm] | 2 | 0 | 12 | 4 | 0 | 7 |
|  | Normal peeling [N/25 mm] | 7.4 | 6.4 | 4.4 | 7.2 | 5.5 | 3.8 |
| Peeling state | MB[2] [area %] | 90 | 90 | — | 90 | 50 | — |
|  | AF[3] [area %] | 10 | 10 | 100 | 10 | 50 | 100 |
|  | Heat tolerance creep [mm] | 12 | 4 | Dropped | Dropped | Dropped | Dropped |

[1] Without a carboxy group
[2] MB: material failure of an adherend
[3] AF: interface failure from an adherend/adhesive interface

TABLE 2

| Component composition (unit: parts by weight) |  | Example 3 | Example 4 | Reference Example 5 | Reference Example 6 |
|---|---|---|---|---|---|
| Polyester resin 1 (molecular weight 2200, acid value 74 mg KOH/g) |  | 16 | 16 | 16 | 16 |
| Polyester resin 2 (molecular weight 6800, acid value 24 mg KOH/g) |  | 4 | 4 | 4 | 4 |
| Carbodiimide |  | 5* | 5* | 5* | 5** |
| Fine powder used | Calcium carbonate | ○ | — | — | — |
|  | Clay | — | ○ | — | — |
|  | Titanium oxide | — | — | ○ | — |

*parts by weight of fine powder coated carbodiimide
**parts by weight of carbodiimide without fine powder coating

TABLE 3

|  | Example 3 | | Example 4 | | Reference Example 5 | | Reference Example 6 | |
|---|---|---|---|---|---|---|---|---|
| Curing condition | Before storage | After storage | Before storage | After storage | Before storage | After storage | Before storage | After storage |
| 195° C., 2 min | 7087 | 7165 | 6459 | 6528 | 7101 | 2889 | 7608 | 2694 |
| 195° C., 5 min | 8297 | 8097 | 8637 | 8881 | 7400 | 3098 | 9236 | 2692 |

TABLE 4

|  |  | Example 3 | | Example 4 | | Reference Example 5 | | Reference Example 6 | |
|---|---|---|---|---|---|---|---|---|---|
|  |  | Before storage | After storage | Before storage | After storage | Before storage | After storage | Before storage | After storage |
| Initial creep [mm] |  | 0 | 2 | 1 | 1 | 0 | — | 0 | — |
| Peeling state | CF[1] [area %] | 0 | 90 | 90 | 90 | — | — | — | — |
|  | FAF[2] [area %] | 0 | 10 | 10 | 10 | — | — | — | — |
| Normal peeling [N/25 mm] |  | 7.8 | 7.1 | 7.4 | 7.8 | 7.3 | — | 7.3 | — |
| Peeling state | FMB[3] [area %] | 90 | 70 | 80 | 80 | 80 | — | 70 | — |
|  | FAF[2] [area %] | 10 | 30 | 20 | 20 | 20 | — | 30 | — |
| Heat tolerance creep [mm] |  | 3 | 4 | 1 | 3 | 1 | — | 4 | — |
| Peeling state | CF[1] [area %] | 100 | 20 | 100 | 90 | 100 | — | 100 | — |
|  | FAF[2] [area %] | — | 80 | — | 10 | — | — | — | — |
| Blocking |  | — | A | — | A | — | B | — | B |

[1] CF: adhesive failure

[2] FAF: interface failure from a fabric with urethane foam/adhesive interface

[3] FMB: material failure of a fabric with urethane foam

Reference Signs List

| | |
|---|---|
| 1 | Coating booth |
| 2 | Conveyor |
| 3 | Grounding |
| 4 | Adherend |
| 5 | Electrostatic powder spray gun |
| 6 | Powder adhesive |
| 7 | Powder adhesive feeding tank |
| 8 | Compressor |
| 9 | High voltage generator |
| 10 | Duct |
| 11 | Recovery unit |
| 20 | Automobile interior part (test sample) |
| 21 | Kenaf-polypropylene resin composite board |
| 22 | Fabric with urethane foam |
| 23 | Weight |
| 24 | Wire |
| L | Peeled length |

The invention claimed is:

1. An adhering method used for forming an automobile interior part, the adhering method comprising a step of spray-coating an adhered with a powder adhesive using an electrostatic powder spray gun,
wherein the powder adhesive includes a mixture of two or more powders containing compounds having reactivity with each other,
wherein one of the powders is a powder including a compound having a functional group containing a nitrogen atom, and
wherein the powder including a compound having a functional group containing a nitrogen atom has a surface fixed with a powder composed of calcium carbonate and/or clay.

2. The adhering method used for forming an automobile interior part according to claim 1,
wherein one of the powders is a powder including a polyester resin compound having a carboxy group and a number average molecular weight of 1,000 to 35,000.

3. The adhering method used for forming an automobile interior part according to claim 1,
wherein the functional group containing a nitrogen atom is a carbodiimide group.

4. The adhering method used for forming an automobile interior part according to claim 1, the adhering method further comprising a step for melting the powder adhesive on the adherend by heating with an infrared heater, the adherend being spray-coated with the powder adhesive.

5. The adhering method used for forming an automobile interior part according to claim 1,
wherein the weight ratio of the powder including a compound having the functional group containing a nitrogen atom and the powder composed of calcium carbonate and/or clay is 100/1 to 100.

6. The adhering method used for forming an automobile interior part according to claim 1,
wherein the mean particle size of the powder composed of calcium carbonate and/or clay is at most $1/10$ the mean particle size of the powder including a compound having the functional group containing a nitrogen atom.

* * * * *